(12) United States Patent
Letzelter et al.

(10) Patent No.: US 10,767,105 B2
(45) Date of Patent: Sep. 8, 2020

(54) REDISPERSION OF SCHIZOPHYLLAN

(71) Applicant: Wintershall Holding GmbH, Kassel (DE)

(72) Inventors: Thomas Letzelter, Annweiler (DE); Sascha Rollie, Mannheim (DE); Andreas Bauder, Mannheim (DE); Florian Lehr, Schwegenheim (DE); Burkhard Ernst, Giesen (DE); Daniel Silbernagel, Kirchheim (DE); Tobias Käppler, Maxdorf (DE)

(73) Assignee: BASF SE, Ludwigshafen (DE)

( * ) Notice: Subject to any disclaimer, the term of this patent is extended or adjusted under 35 U.S.C. 154(b) by 97 days.

(21) Appl. No.: 15/765,038

(22) PCT Filed: Sep. 30, 2016

(86) PCT No.: PCT/EP2016/073398
§ 371 (c)(1),
(2) Date: Mar. 30, 2018

(87) PCT Pub. No.: WO2017/055532
PCT Pub. Date: Apr. 6, 2017

(65) Prior Publication Data
US 2018/0273831 A1    Sep. 27, 2018

(30) Foreign Application Priority Data
Oct. 2, 2015 (EP) .................... 15188083

(51) Int. Cl.
*C09K 8/588* (2006.01)
*C09K 8/035* (2006.01)

(52) U.S. Cl.
CPC .............. *C09K 8/588* (2013.01); *C09K 8/035* (2013.01)

(58) Field of Classification Search
None
See application file for complete search history.

(56) References Cited

U.S. PATENT DOCUMENTS 3,436,346 A * 4/1969 Ferguson ............ C08B 37/0024
507/211
6,482,942 B1 * 11/2002 Vittori .................. A61K 31/715
536/127

(Continued)

FOREIGN PATENT DOCUMENTS

CA    2063490 A1    9/1992
CA    1329159 C    5/1994

(Continued)

OTHER PUBLICATIONS

Extended European Search Report for EP Patent Application No. 15188083.8, dated Mar. 22, 2016, 3 pages.

(Continued)

*Primary Examiner* — John J Figueroa
(74) *Attorney, Agent, or Firm* — Faegre Drinker Biddle & Reath LLP

(57) ABSTRACT

The present invention relates to a method for preparing a concentrated polysaccharide mass, in particular a method for preparing concentrated glucan or schizophyllan, in particular a method for redispersing glucan or schizophyllan for producing a ready-to-use mass.

8 Claims, 3 Drawing Sheets

(56) References Cited

U.S. PATENT DOCUMENTS

| | | | | | |
|---|---|---|---|---|---|
| 2008/0248098 | A1* | 10/2008 | Jin | ............... | A61K 9/1623 424/450 |
| 2012/0205099 | A1* | 8/2012 | Briechle | ............... | C09K 8/588 166/270.1 |
| 2014/0271605 | A1* | 9/2014 | Harel | ............... | A23L 33/00 424/94.6 |
| 2014/0364344 | A1 | 12/2014 | Weinstein et al. | | |

FOREIGN PATENT DOCUMENTS

| | | | |
|---|---|---|---|
| DE | 4012238 | A1 | 1/1991 |
| EP | 271907 | A2 | 6/1988 |
| EP | 504673 | A1 | 9/1992 |
| EP | 463540 | B1 | 10/1996 |
| EP | 2197974 | A1 | 6/2010 |
| EP | 2344273 | A2 | 7/2011 |
| WO | WO-2008071808 | A1 | 6/2008 |
| WO | WO-2010054197 | A2 | 5/2010 |
| WO | WO-2012110539 | A1 | 8/2012 |

OTHER PUBLICATIONS

Kim, et al., "Anti-apoptotic Activity of Laminarin Polysaccharides and their Enzymatically Hydrolyzed Oligosaccharides from Laminaria japonica", Biotechnology Letters, vol. 28, Issue 6, Mar. 2006, pp. 439-446.

Nikitina, et al., "Lentinula edodes Biotechnology—From Lentinan to Lectins", Food Technology and Biotechnology, vol. 45, Issue 3, 2007, pp. 230-237.

Novak, et al., "Glucans as Biological Response Modifiers", Endocrine, Metabolic & Immune Disorders-Drug Targets, vol. 9, Issue 1, Mar. 2009, pp. 67-75.

Stahmann, et al., "Degradation of Extracellular $\beta$-(1,3)(1,6)-d-Glucan by Botrytis cinerea", Applied and Environmental Microbiology, vol. 58, Issue 10, Oct. 1992, pp. 3347-3354.

Survase, et al., "Scleroglucan: Fermentative Production, Downstream Processing and Applications", Food Technology and Biotechnology, vol. 45, Issue 2, Apr. 2007, pp. 107-118.

International Search Report for PCT/EP2016/073398 dated Oct. 26, 2016.

Written Opinion of the International Searching Authority for PCT/EP2016/073398 dated Oct. 26, 2016.

\* cited by examiner

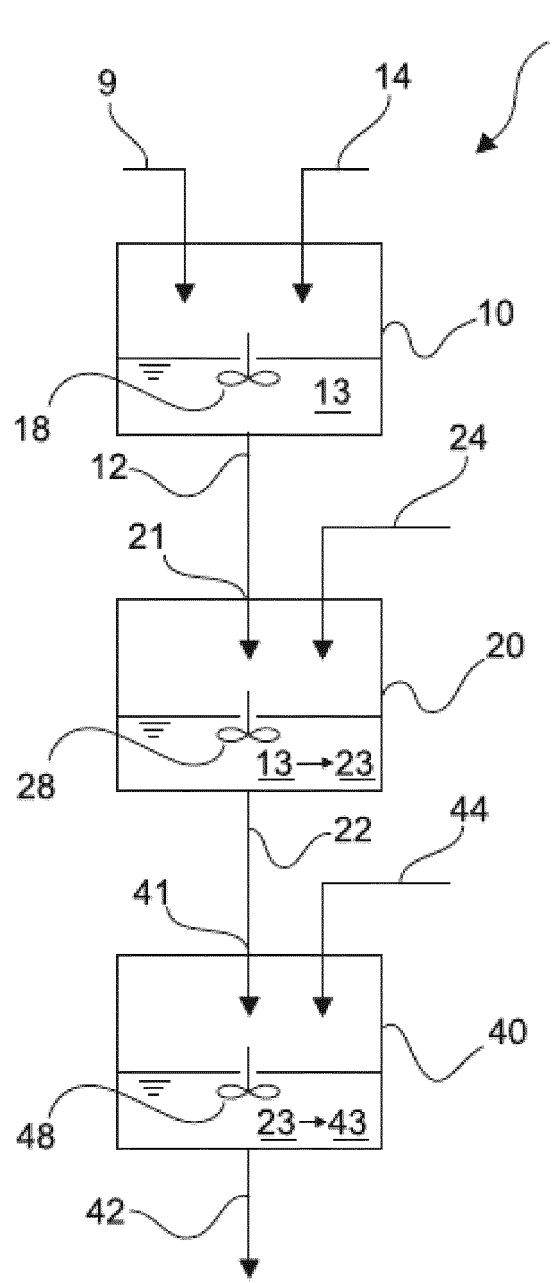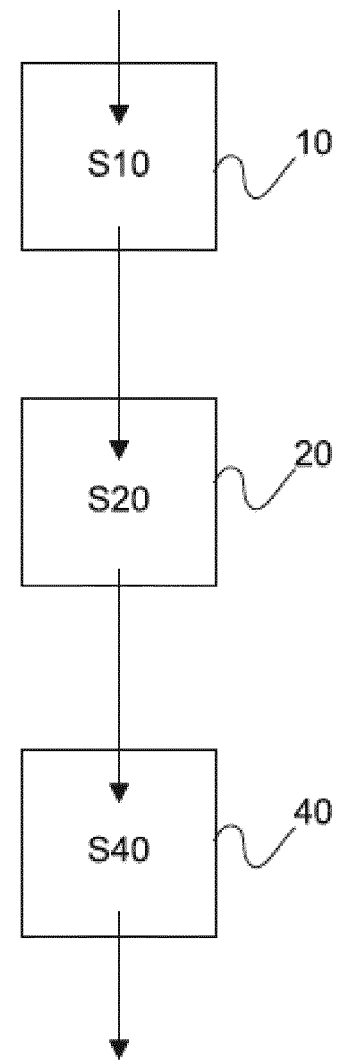
Fig. 1                    Fig. 2

REDISPERSION OF SCHIZOPHYLLAN

CROSS-REFERENCE TO RELATED APPLICATIONS

This application is a national stage application (under 35 U.S.C. § 371) of PCT/EP2016/073398, filed Sep. 30, 2016, which claims benefit of European Application No. 15188083.8, filed Oct. 2, 2015, both of which are incorporated herein by reference in their entirety.

FIELD OF THE INVENTION

The present invention relates to a method for preparing a concentrated polysaccharide mass, in particular a method for preparing concentrated glucan or schizophyllan, in particular a method for redispersing glucan or schizophyllan for producing a ready-to-use mass.

BACKGROUND OF THE INVENTION

The most varied methods are used for obtaining crude oil. In the development of oil fields, only a part of the available oil may be obtained by spontaneous extraction. After a spontaneous extraction, however, a significant part of the oil remains in the rock. This is what is termed primary extraction, in which the oil comes out of the ground spontaneously without further influence, and therefore leads only to a partial exploitation of the oil reserves. However, the yield can be increased by separating the oil in the rock by displacement processes, as is performed, for example, in the context of what is termed secondary extraction. However, in this case, considerable amounts of oil reserves still remain in capillary rock channels, which oil reserves cannot be separated by a simple pumping or displacement process. Therefore, in the context of what is termed tertiary extraction for example, a liquid having defined rheological behavior is introduced into the rock strata and the capillary channels thereof, in order to displace the crude oil from the capillaries also. For the production of such liquids, polymers of natural origin are also used. Suitable thickening polymers for a tertiary oil extraction must meet a number of specific requirements. In addition to a sufficient viscosity, the polymers must also be very stable thermally, and the thickening effect thereof must also be retained at high salt concentrations. An important class of polymers of natural origin for polymer flooding for obtaining oil comprises polysaccharides, in particular branched homopolysaccharides, that are obtained from glucose, for example beta-glucans. The aqueous solutions of such beta-glucans have advantageous physicochemical properties, in such a manner that they are particularly suitable for polymer flooding of oil-comprising rock strata. Therefore, beta-glucans are suitable as thickeners in the field of tertiary oil extraction.

Beta-glucans are components of cell walls in several microorganisms, in particular in fungi and yeast (Novak, Endocrine, Metabol & Immune Disorders—Drug Targets (2009), 9: 67-75). From the biochemical aspect, beta-glucans are non-cellulosic polymers of beta-glucose linked by beta(1-3)-glycosidic bonds that have a defined branching pattern with beta-(1-6)-linked glucose molecules (Novak, loc. cit.). A multiplicity of closely related beta-glucans has a similar branching pattern such as, e.g., schizophyllan, scleroglucan, pendulan, cinerian, laminarin, lentinan and pleuran, which all have a linear main chain of beta-D-(1-3)-glucopyranosyl units with a single beta-D-glucopyranosyl unit which is (1-6)-linked to a beta-D-glucopyranosyl unit of the linear main chain, with a mean degree of branching of approximately 0.3 (Novak, loc. cit.; EP-B1 463540; Stahmann, Appl Environ Microbiol (1992), 58: 3347-3354; Kim, Biotechnol Letters (2006), 28: 439-446; Nikita, Food Technol Biotechnol (2007), 45: 230-237). At least two of said beta-glucans—schizophyllan and scleroglucan—even have an identical structure and differ only slightly in molecular mass thereof, i.e. in their chain length (Survase, Food Technol Biotechnol (2007), 107-118).

For the use in displacement liquids, beta-glucan-comprising liquids must be made available at the oil production sites. This poses a transport problem to the operators of the production sites, since considerable amounts of beta-glucan-comprising liquids are required in order to obtain a meaningful tertiary yield. Therefore, operators are increasingly changing over to concentrating the beta-glucan-comprising or polysaccharide-comprising liquids, and so the transport expense is smaller. However, this requires a preparation of the concentrated liquids on site, in which the water fractions removed previously are fed back to the concentrated liquid.

Many processes for producing beta-glucans comprise culturing and fermenting microorganisms that are able to synthesize such biopolymers. For example, EP 271 907 A2, EP 504 673 A1 and DE 40 12 238 A1 describe a method in which the fungus *Schizophyllum commune* is fermented by agitation and with air supply in sections.

The culture medium substantially comprises glucose, yeast extract, potassium dihydrogen-phosphate, magnesium sulfate and water. EP 271 907 A2 describes a method for separating the polysaccharide in which the culture suspension is first centrifuged and the polysaccharide is precipitated from the supernatant with isopropanol. A second method comprises a pressure filtration followed by an ultrafiltration of the resultant solution, without the details of this method having been disclosed. "Udo Rau, "Biosynthese, Produktion und Eigenschaften von extrazellulären Pilz-Glucanen" [Biosynthesis, production and properties of extracellular fungal glucans], post doctoral thesis, Technical University of Brunswick, 1997, pages 70 to 95" and "Udo Rau, Biopolymers, Editor A. Steinbüchel, Volume 6, pages 63 to 79, WILEY-VCH Publishers, New York, 2002" describe the preparation of schizophyllan by continuous fermentation or fermentation in batch mode. "GIT Fachzeitung Labor 12/92, pages 1233-1238" discloses a continuous method for preparing scleroglucans using *Sclerotium rolfsii*.

For economic reasons, the concentration of the aqueous beta-glucan solution should be as high as possible to keep the costs of transporting the aqueous glucan solutions from the production site to the use site as low as possible, in particular if the preparation is to be performed within short periods of time.

A system is known, for example, from the prior art EP 2 197 974 A1 for improving oil extraction, using water-soluble polymers.

In addition, WO 2008/071808 A1 discloses a device for producing a water-soluble polymer for tertiary oil recovery.

The document WO 2012/110539 A1 discloses a two-stage method for crude oil extraction wherein an aqueous formulation comprising at least one glucan is injected into a crude oil reservoir through an injection borehole, and crude oil is removed from said reservoir through a production borehole. The aqueous formulation is produced in two stages, an aqueous concentrate of the glucan being produced first and the concentration then being diluted with water on-site to obtain the concentration for use.

From the patent application US 2014/364344 A1 a system and a method are known to produce an aqueous solution from a powder starting material, the solution being usable in tertiary oil recovery. The system comprises a mixer and a plurality of compartments in a tank. The solution can flow through the compartments or can be deviated around one or more compartments. The aqueous solution is adjusted via its residence time inside the respective compartments of the system.

Furthermore, EP 2 344 273 A1 discloses a method using high shear for producing micronized waxes.

The object of the present invention is to provide a method for redispersing polysaccharides, in particular beta-glucans, that are in concentrated form, in order to obtain an aqueous solution comprising polysaccharides, in particular beta-glucans that is suitable for the use in tertiary oil recovery, as is illustrated by a low FR value, in particular by an FR value≤3.0 determined using a membrane that has a pore size of 1.2 μm.

SUMMARY OF THE INVENTION

The invention provides a method for preparing a concentrated polysaccharide mass according to the subject matter of claim 1, wherein developments of the invention are embodied by the dependent claims.

According to an embodiment of the invention, a method for preparing a concentrated polysaccharide mass is provided, wherein the method comprises:
(1) blending (S10) the concentrated polysaccharide mass having a polysaccharide concentration [c1], to obtain a mash having a polysaccharide concentration [c2], wherein the blending comprises adding a first dilution liquid, and during the blending a particle size of particles of the concentrated polysaccharide mass is decreased and mixing with the first dilution liquid proceeds;
(2) homogenizing (S20) the mash having a polysaccharide concentration [c2], in order to obtain a homogenized mash having a polysaccharide concentration [c3], wherein, during the homogenization, homogenization of particles in the mash proceeds;
(3) diluting (S40) the homogenized mash having a polysaccharide concentration [c3], in order to obtain a diluted homogenized mash having a polysaccharide concentration [c4], wherein the dilution comprises addition of a third dilution liquid,
wherein the ratio of [c1] to [c4] is in the range from ≥1:30 to ≤1:20 000.

Preferably, the ratio of [c1] to [c4] is in the range from ≥1:30 to ≤1:10 000, particularly preferably in the range from ≥1:50 to ≤1:10 000, very particularly preferably in the range from ≥1:60 to ≤1:5000, still more preferably in the range from ≥1:80 to ≤1:5000.

In this manner, a method can be provided with which a concentrated polysaccharide mass can be redispersed within short timeframes, in such a manner that a ready-to-use mass can be provided that can be used for tertiary oil extraction or oil recovery. As a result of the stepwise process of blending, homogenization and dilution, the redispersion process can be significantly shortened in such a manner that the storage and process volumes, in particular in the offshore region, can be kept relatively low. In the various sections, account can be taken of the particular properties in the respective stage of the concentrated polysaccharide mass that is to be ωprocessed.

In the context of the present invention, the concentrated polysaccharide mass can comprise a beta-glucan, in particular schizophyllan. In the context of the present inventions, an addition of a third dilution liquid need not necessarily presuppose an addition of a second dilution liquid, but also does not exclude it.

A blending in the meaning of this invention is to be taken to mean the bringing about of coarsely dispersed particles in the liquid in such a manner that a free-flowing and pumpable mass is formed. During the blending, a first comminution of concentrated polysaccharide mass and the feeding of a dilution liquid can proceed. Preferably, the concentrated polysaccharide mass, before the blending, can be in the form of slabs, chunks and lumps having an irregular shape.

Preferably, the polysaccharide mass that is used in step (1) has a volume in the range from ≥100 cm$^3$ to ≤50 000 cm$^3$, particularly preferably ≥100 cm$^3$ to ≤25 000 cm$^3$, still more preferably in the range from ≥500 cm$^3$ to ≤10 000 cm$^3$, very particularly preferably in the range from ≥800 cm$^3$ to ≤5000 cm$^3$.

The procedure of the homogenization in the context of this invention comprises the comminution and distribution of particles in a starting material. In a water basis, for example polysaccharide particles or chunks can be comminuted and distributed in the water in such a manner that generally the concentration differences of the polysaccharide in the water become lower. In the ideal case of the homogenization, the concentration differences are microscopically and macroscopically zero.

Particles in the context of this invention are taken to mean clusters of polysaccharide that is not, or not yet completely, dissolved. These particles can, for example, be of chunk type, for instance be broken out of a high-viscosity pasty mass, and have the above-described dimensions. Particles, however, can also be taken to mean collections or local concentrations that form gel-type regions.

A dilution liquid in the context of this invention is a fluid which, when it is added to the present mass comprising a material, the concentration of the material in the total mass is decreased. In the case of a dilution liquid water, other materials can also be added to the water, such as additives. The first and third, or the first, second and third, dilution liquid can be identical, e.g. water.

Preferred additives can be selected from the group consisting of biocides, surfactants, pH adjusters, tracers and salts. Examples of suitable biocides are isothiazolinones, for example 1,2-benzisothiazolin-3-one ("BIT"), octylisothiazolinone ("OIT"), dichlorooctylisothiazolinone ("DCOIT"), 2-methyl-2H-isothiazolin-3-one ("MIT") and 5-chloro-2-methyl-2H-isothiazolin-3-one ("CIT"), phenoxyethanol, alkylparabens such as methylparaben, ethylparaben, propylparaben, benzoic acid and salts thereof, such as, e.g., sodium benzoate, benzyl alcohol, alkali metal sorbates such as, e.g., sodium sorbate, and (substituted) hydantoins such as, e.g., 1,3-bis(hydroxymethyl)-5,5-dimethylhydantoin (DMDM-hydantoin). Examples of surfactants are, in particular, nonionic surfactants and also mixtures of anionic or zwitterionic surfactants with nonionic surfactants. Preferred nonionic surfactants are alkoxylated alcohols and alkoxylated fatty alcohols, di- and multiblock copolymers of ethylene oxide and propylene oxide and reaction products of sorbitan with ethylene oxide or propylene oxide, alkylglycosides and what are termed amine oxides. Examples of anionic surfactants are $C_8$-$C_{20}$-alkylsulfates, $C_8$-$C_{20}$-alkylsulfonates and $C_8$-$C_{20}$-alkyl ether sulfates having 1 to 6 ethylene oxide units per molecule. Preferred salts are all salts that are customarily present in seawater. Preferred pH adjusters are inorganic bases such as, for example, sodium hydroxide and ammonium hydroxide, organic acids, inorganic acids such as, for example, nitric acid, ammonium chloride, ammonium carbonate, ammonium nitrate, ammonium sulfate and also ammonium formate and ammonium acetate.

Water as dilution fluid in the context of this invention is a liquid which, with respect to the dilution, predominantly has the properties of water. In this case, a liquid that, for example, comprises 95-99% water, can also be water in the context of the invention, provided that this liquid, in respect of a dilution behavior, predominantly has the properties of water.

The method with blending, homogenizing and dilution can be carried out, for example, in volumes arranged successively in the direction of flow, for example a blending volume, a homogenization volume and a dilution volume. It is also possible to carry out the method in such a manner that a homogenization and a dilution take place in the same volume.

According to an embodiment of the invention, the diluted homogenized mash is a solution that has an FR value preferably in the range from ≥1.0 to ≤3.0, particularly preferably an FR value in the range from ≥1.0 to ≤2.5, very particularly preferably an FR value in the range from ≥1.0 to ≤2.4, still more preferably an FR value in the range from ≥1.0 to ≤2.0, which is determined using a membrane that has a pore size of 1.2 µm.

According to an embodiment of the invention, the polysaccharide comprises at least one alpha-glucan, a beta-glucan or a xanthan.

In this manner, a prepared polysaccharide mass can be provided on the basis of different glucans or xanthan. In particular, beta-1,3- or a beta-1,4-glucan can be used.

According to an embodiment of the invention, the homogenization comprises an addition of a second dilution fluid.

In this manner, concentrated polysaccharide mass having a polysaccharide concentration [c1] can be diluted in all stages of the redispersion process or the preparation process, namely during the blending, during the homogenization and during the dilution.

According to an embodiment of the invention, the homogenization comprises at least one first stage and one second stage of a homogenization, of which the second stage has a higher homogenization than the first stage.

In this manner, the homogenization can be carried in a stepped manner, or in substeps, in such a manner that a more efficient preparation process can be achieved. In particular, during the homogenization, particles or fractions of the homogenized mash that still have relatively large particles can be separated off, while other parts of the homogenized mash that only still comprise smaller particles sizes, can be fed to further processing. The larger particles separated off can be subjected to a renewed homogenization step. This process can also proceed continuously, by sufficiently small particles passing through a sieve or a filter, whereas larger particles are retained, and remain in the homogenization volume until they have been comminuted to the extent that they likewise can pass through the sieve. In total, in this manner, a higher throughput during homogenization can be achieved.

According to an embodiment of the invention, the homogenization comprises at least one first stage, a second stage, and a third stage of the homogenization, of which the third stage has a higher homogenization than the second stage, and the second stage has a higher homogenization than the first stage.

According to an embodiment of the invention, the dilution of the homogenized mash comprises a further homogenization of the homogenized mash.

In this manner, a further homogenization can also proceed during the dilution, in such a manner that the mass resulting from the method not only reaches a corresponding dilution, but also a desired homogenization.

According to an embodiment of the invention, preferably at least one of the first, second and third dilution liquids is water. According to a further embodiment of the invention, preferably the first, the second and the third dilution liquid is water. In this manner, the preparation or dilution of the concentrated polysaccharide mass can be performed using a dilution liquid which has good availability. The amount of dilution liquid can be controlled, for example, via an inline viscosity measurement.

In this manner, an expedient and efficient staging of the dilution in the course of the method sections of blending, homogenization and dilution can be achieved, which leads to a prompt and efficient preparation of a concentrated polysaccharide mass.

According to an embodiment of the invention, the concentrated polysaccharide mass preferably has a concentration [c1] in the range from ≥50 g to ≤800 g of polysaccharide per liter of concentrated polysaccharide mass, particularly preferably a concentration [c1] in the range from ≥60 g to ≤500 g of polysaccharide per liter of concentrated polysaccharide mass, very particularly preferably a concentration [c1] in the range from ≥80 g to ≤300 g of polysaccharide per liter of concentrated polysaccharide mass, still more preferably a concentration [c1] in the range from ≥80 g to ≤100 g of polysaccharide per liter of concentrated polysaccharide mass.

The further components of the polysaccharide mass can be water, additives and precipitant. Therefore, the concentrated polysaccharide mass preferably has a concentration [c1] of in the range from ≥50 g to ≤800 g of polysaccharide per liter of concentrated polysaccharide mass comprising polysaccharide, water, additives and precipitant, particularly preferably a concentration [c1] in the range from ≥60 g to ≤500 g of polysaccharide per liter of concentrated polysaccharide mass comprising polysaccharide, water, additives and precipitant, very particularly preferably a concentration [c1] in the range from ≥80 g to ≤300 g of polysaccharide per liter of concentrated polysaccharide mass comprising polysaccharide, water, additives and precipitant, still further preferably a concentration [c1] in the range from ≥80 g to ≤100 g of polysaccharide per liter of concentrated polysaccharide mass comprising polysaccharide, water, additives and precipitant.

Suitable precipitants are organic solvents. Organic solvents are preferably selected from the group consisting of methylformate, acyclic ethers such as dimethoxymethane, cyclic ethers such as tetrahydrofuran, 2-methyl-1,2-dioxolane, esters of carboxylic acids such as ethyl acetate, alcohols such as methanol, ethanol, isopropanol and propanol, ketones such as acetone or methyl ethyl ketone or mixtures thereof. Equally suitable organic solvents comprise polyethylene glycols, polypropylene glycols and mixtures thereof.

According to an embodiment of the invention, the mash preferably has a concentration [c2] in the range from ≥5 g to ≤50 g of polysaccharide per liter of mash, particularly preferably a concentration [c2] in the range from ≥5 g to ≤30 g of polysaccharide per liter of mash, very particularly preferably a concentration [c2] in the range from ≥8 g to ≤30 g of polysaccharide per liter of mash.

The further components of the mash can be water, additives and precipitants. Therefore, the mash preferably has a concentration [c2] of in the range from ≥5 g to ≤50 g of polysaccharide per liter of mash comprising polysaccharide, water, additives and precipitants, particularly preferably a concentration [c2] in the range from ≥5 g to ≤30 g of polysaccharide per liter of mash comprising polysaccharide, water, additives and precipitants, very particularly preferably a concentration [c2] in the range from ≥8 g to ≤30 g of polysaccharide per liter of mash comprising polysaccharide, water, additives and precipitants.

According to an embodiment of the invention, the homogenized mass preferably has a concentration [c3] in the range from ≥5 g to ≤50 g of polysaccharide per liter of homogenized mash, particularly preferably a concentration [c3] in the range from ≥5 g to ≤30 g of polysaccharide per liter of homogenized mash, very particularly preferably a concentration [c3] in the range from ≥8 g to ≤30 g of polysaccharide per liter of homogenized mash.

The further components of the homogenized mash can be water, additives and precipitants. Therefore, the homogenized mash preferably has a concentration [c3] of in the range from ≥5 g to≤50 g of polysaccharide per liter of homogenized mash comprising polysaccharide, water, additives and precipitants, particularly preferably a concentration [c3] in the range from ≥5 g to ≤30 g of polysaccharide per liter of homogenized mash comprising polysaccharide, water, additives and precipitants, very particularly preferably a concentration [c3] in the range from ≥8 g to ≤30 g of polysaccharide per liter of homogenized mash comprising polysaccharide, water, additives and precipitants.

Preferably, no further dilution fluid is added during the homogenization, and so the concentration [c2] of the mash and the concentration [c3] of the homogenized mash are preferably identical. Particularly preferably, the concentration [c3] of the homogenized mash does not differ by more than ±1% from the concentration [c2] of the mash.

According to an embodiment of the invention, the diluted homogenized mash preferably has a concentration [c4] in the range from ≥0.05 g to ≤2.0 g of polysaccharide per liter of diluted homogenized mash, particularly preferably a concentration [c4] in the range from ≥0.1 g to ≤1.5 g of polysaccharide per liter of diluted homogenized mash, very particularly preferably a concentration [c4] in the range from ≥0.1 g to ≤1 g of polysaccharide per liter of diluted homogenized mash.

The further components of the diluted homogenized mash can be water, additives and precipitants. Therefore, the homogenized mash preferably has a concentration [c4] of in the range from ≥0.05 g to ≤2.0 g of polysaccharide per liter of diluted homogenized mash comprising polysaccharide, water, additives and precipitants, particularly preferably a concentration [c4] in the range from ≥0.1 g to ≤1.5 g of polysaccharide per liter of diluted homogenized mash comprising polysaccharide, water, additives and precipitants, very particularly preferably a concentration [c4] in the range from ≥0.1 g to ≤1.0 g of polysaccharide per liter of diluted homogenized mash comprising polysaccharide, water, additives and precipitants.

In this manner, a polysaccharide mass concentration can be achieved which significantly reduces the transport volume and the transport masses compared with a volume that a ready-to-use diluted homogenized mash would have which is required for the oil recovery.

According to an embodiment of the invention, the homogenization and the dilution each proceed in a continuous-flow process in which a substantially continuous flow proceeds from a blending volume into a homogenizing volume, and from the homogenizing volume into a dilution volume.

In this manner, at least in subregions of the method, a flow process can be provided which can further reduce the necessary storage volumes, since the ready-to-use product can be provided substantially continuously, in particular in an amount currently required, without it needing to be temporarily stored in large volumes.

According to an embodiment of the invention, a method for recovering fossil fuels from rock is provided, wherein the method comprises the above-described method for preparing a concentrated polysaccharide mass, and also introducing the diluted homogenized mash into a rock for recovering fossil fuels from the rock.

In this manner, a method can be provided in which an efficient tertiary oil recovery from rock can be provided.

A device for preparing a concentrated polysaccharide mass is provided, that is suitable for the performance of the method according to the invention, wherein the device comprises: a blending volume for blending the concentrated polysaccharide mass, in order to obtain a mash, wherein the blending comprises an addition of a first dilution liquid, and during the blending a particle size of particles of the concentrated polysaccharide mass is decreased, and mixing with the first dilution liquid proceeds; a homogenizing volume for homogenizing the mash in order to obtain a homogenized mash, wherein homogenization of particles in the mash proceeds during the homogenization; and a dilution volume for diluting the homogenized mash in order to obtain a diluted homogeneous mash, wherein the dilution comprises an addition of a third dilution liquid, wherein the blending volume has an outlet for the mash, wherein the homogenization volume has an inlet for the mash and an outlet for the homogenized mash, wherein the dilution volume has an inlet for the homogenized mash and an outlet for the diluted homogenized mash, wherein the outlet for the mash is connected to the inlet for the mash and the outlet for the homogenized mash is connected to the inlet for the homogenized mash.

In this manner, a device can be provided with which a concentrated polysaccharide mass can be efficiently prepared.

According to an embodiment of the invention, in the blending volume, a mixer of the high-shear mixer type and/or eccentric hopper pump type is provided.

Preferably, the high-shear mixer is a rotor-stator mixer. Rotor-stator mixers are familiar to those skilled in the art and comprise in principle all dynamic mixer types in which a fast-running, preferably rotationally symmetrical, rotor, in interaction with a stator, forms one or more substantially ring-gap-type working regions. In these working regions, the mixing material is exposed to high thrust and shear stresses, wherein in the ring gaps frequently high turbulence prevails, which likewise promotes the mixing process. Rotor-stator mixers include, for example, toothed rim dispersers, ring-gap mills and colloid mills.

According to an embodiment of the invention, a mixer of the high-shear mixer type is provided in the homogenization volume.

According to an embodiment of the invention, a mixer of the high-shear mixer type is provided in the dilution volume.

In a preferred embodiment, at least one tank for storing the homogenized mash can be provided between the blending volume and the homogenization volume. In a preferred embodiment, at least one tank for storing the homogenized mash can be provided between the homogenization volume and the dilution volume.

It should be noted that the embodiments of the invention described hereinafter apply equally to the method and to the device. The individual features can, of course, also be combined among one another, as a result of which, advantageous effects can be established, in part, which go beyond the sum of the individual effects. These and other aspects of the present invention are explained and clarified by reference to the exemplary embodiments described hereafter.

In a preferred embodiment, a part of the homogenized mash can be used to be recirculated in step (1) for blending or in step (2) for homogenizing. In this manner, both in step (1) and in step (2), a faster homogenization is effected.

BRIEF DESCRIPTION OF THE DRAWINGS

FIG. 1 shows a structural makeup of the device according to the invention according to an exemplary embodiment.

FIG. 2 shows an exemplary sequence of a method according to an exemplary embodiment of the invention.

DETAILED DESCRIPTION OF EXEMPLARY EMBODIMENTS

Figure 3:
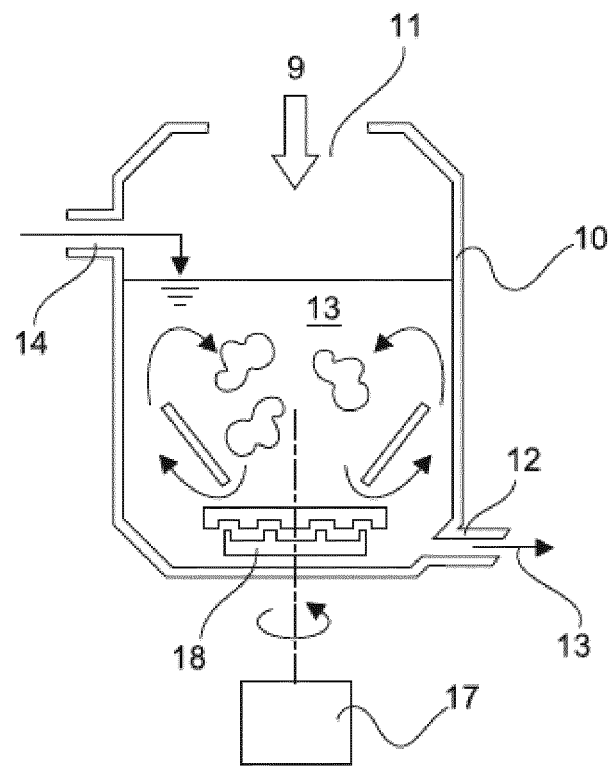
FIG. 3 shows an exemplary makeup of a mashing volume according to an exemplary embodiment.

FIG. 1 shows a diagrammatic view of a device for preparing a concentrated polysaccharide mass. The device 1 for preparing a concentrated polysaccharide mass has, in the embodiment shown in FIG. 1, a blending volume 10, a homogenization volume 20 and a dilution volume 40.

The homogenization volume 20 is connected downstream of the blending volume 10.

The concentrated polysaccharide mass 9 is added to the blending volume 10 and also a first dilution liquid 14. The polysaccharide mass 9 can in this case have a concentration of, for example, 100 to 900 g of polysaccharide mass per liter of concentrated polysaccharide mass. The polysaccharide mass 9 can likewise be the direct product of a previously carried out precipitation process. The dilution liquid can be, for example, water. In the blending volume 10, for example a mixer 18 can be provided which mixes the polysaccharide mass 9 with the dilution liquid 14. In addition to the mixer, at the blending tank or upstream of the blending tank 10, a comminution device can be provided in order to comminute a high-viscosity or pasty polysaccharide mass before said mass is fed to the blending volume 10. The comminution can also proceed in the blending volume 10. This can proceed, for example, using a high-shear mixer, such as, for example, using a rotor-stator mixer. In the one blending volume 10, then a mash 13 of the added polysaccharide mass 9 and the first dilution liquid 14 is formed. The mash 13 can leave the blending volume 10 via an outlet 12 in the blending tank for the mash and be introduced via an inlet 21 into the homogenization volume for the mash.

In the homogenization volume 20, likewise a mixer 28 can be provided which can be designed, for example, in the form of a rotor-stator mixer. It is possible, but not compulsory, that a second dilution liquid 24 is introduced in the homogenization volume, which dilution liquid can likewise be, for example water. In this case a homogenized mash 23 can be generated from the mash and the second dilution liquid. In the context of the present invention, from the mash 13 generated in the one blending volume 10, in the homogenization volume 20, even without addition of a second dilution liquid 24, a homogenized mash 23 can be generated.

In the dilution volume 40, likewise a mixer 48 can be provided which can be designed, for example, in the form of a high-shear mixer, preferably in the form of a rotor-stator mixer. In the dilution volume 40, in this case, a diluted homogeneous mash 43 can be generated from the homogenized mash 23. This diluted homogeneous mash 43 can be drained via an outlet 42 in the dilution volume 40. A third dilution liquid 44 can be added to the dilution volume 40, in such a manner that homogenized mash fed to the dilution volume 40 is further diluted by a third dilution liquid 44, in order in this manner, for example, to arrive at a ready-to-use mass that can be used for the tertiary oil extraction.

The aim of the mashing process is production of a pumpable mass. The pumpable mass can in this case, after addition of the first dilution liquid, have, for example, a concentration from 5 to 50 g of polysaccharide per liter of concentrated polysaccharide mass. The concentrated polysaccharide mass can be pasty, for example, or else be in the form of a friable mass. This mass can have, for example, a concentration from 100 to 900 g of polysaccharide per liter of concentrated polysaccharide mass. However, customarily the concentration is lower and can be, for example, in the range from 100 to 300 g of polysaccharide per liter of concentrated polysaccharide mass. In the blending volume 10, mixers, for example, can be provided which perform a further comminution of the concentrated polysaccharide mass and effect a mashing with the added first dilution liquid 14. Mixers can be, for example, mixers of the Cavimix® type from Cavitron. Alternatively, for example, a continuous high-shear mixer from Lipp Mischtechnik GmbH, Mannheim, Germany, can also be used, which effects a defibration or crushing of the pasty mass of the concentrated polysaccharide mass. The energy added by the continuous high-shear mixer can in this case cause heating of the concentrated polysaccharide mass, in such a manner that already in this region an elevated temperature is present that promotes the mashing process. The concentrated polysaccharide mass can in this case be added into a hopper or a reservoir, and transported into a blending volume 10. In the blending tank, in addition, a high-shear mixer can be provided that effects further removal of the particle mass from the particles and further mixing of the polysaccharide mass with the first dilution liquid.

In the downstream homogenization volume 20, a rotor-stator mixer, for example, can be provided, that operates in a plurality of stages. Mixers can be, for example, mixers of the Megatron® MT3-61 GMF type Kinematica, Littau, Switzerland. In the event that no dilution liquid is added to the homogenization volume 20, the concentration remains at the same value, for example, of, for example, 5 to 50 g of polysaccharide per liter of concentrated polysaccharide mass. In the event that a second dilution liquid 24 is added to the homogenization volume 20, for example a concentration of 5 to 10 g of polysaccharide per liter of concentrated polysaccharide mass can be established. The rotor-stator mixer provided in the homogenization volume can be, for example, a toothed rim dispersion machine which, in a plurality of stages, subjects the blended polysaccharide mass to a shear stress, in such a manner that, owing to the shear-diluting property of the mash 13, the homogenized mash becomes thinner.

The homogenized mash 23 can then be added to the dilution volume 40, in which, likewise, a high-shear mixer can be provided, for example a rotor-stator mixer, such as, for example, a toothed-rim dispersion machine. Preferably, a part of the homogenized mash can be returned to the homogenization volume 20 and/or the blending tank. By dilution with a third dilution liquid 44, the final concentration of the diluted homogenized mash can be, for example, 0.1 to 1 g of polysaccharide per liter of concentrated polysaccharide mass, which is, for example, a typical concentration of a ready-to-use mass.

As polysaccharide, for example an alpha-glucan or a beta-glucan, in particular a beta-1,3-glucan or a beta-1,4-glucan or a mixture thereof can be considered, or a xanthan, for example.

FIG. 2 shows an exemplary embodiment of a sequence diagram of a method for preparing a concentrated polysaccharide mass. In FIG. 2, the steps S10, blending the concentrated polysaccharide mass, S20, homogenizing the mash, and S40, diluting the homogenized mash are provided. The blending of the concentrated polysaccharide mass S10 proceeds in this case, for example, in the blending volume 10. The homogenization of the mash S20 proceeds, for example, in the homogenization volume 20. The dilution of the homogenized mash S40 proceeds, for example, in the dilution volume 40.

FIG. 2 shows a method in which, for example, a concentrated polysaccharide mass having 50 to 800 g of polysaccharide per liter of concentrated polysaccharide mass is placed in the blending volume 10. After the step S10 of the blending, for example a concentration from 5 to 50 g of polysaccharide per liter of concentrated polysaccharide mass is present. After the homogenization step, for example a concentration from 5 to 30 g of polysaccharide per liter of concentrated polysaccharide mass can be present, in particular when, during the homogenization of the mash S20, a second homogenization liquid is added. After passage through the method step S40 for diluting the homogenized mash, for example a concentration from 0.05 to 2.0 g of polysaccharide per liter of concentrated polysaccharide mass can be present.

FIG. 3 shows an exemplary embodiment of a blending volume 10. The blending volume 10 in this case has an opening 11, via which the concentrated polysaccharide mass 9 can be added to the blending volume 10. In addition, via an inlet, the first dilution liquid 14 can be added. In the one blending volume 10, for example particles or chunks of the polysaccharide mass 9 can be circulated by a mixer 18 and further comminuted, in such a manner that the particles or chunks of the polysaccharide mass 9 are further dissolved in the dilution liquid. Via a corresponding mixer, for example a high-shear mixer and corresponding guide plates, a mixing process or a mashing process can proceed in such a manner that, via an outlet 12, a mash 13 can be taken off. In the blending tank, devices can be provided, for example screens or combs which prevent oversized polysaccharide chunks 9 being taken off. In this manner, these polysaccharide chunks remain in the blending volume 10 until they have achieved a size that permits further processing in a next step. The mixer 18 can be driven and controlled in this case via a drive 17.

Figure 4:
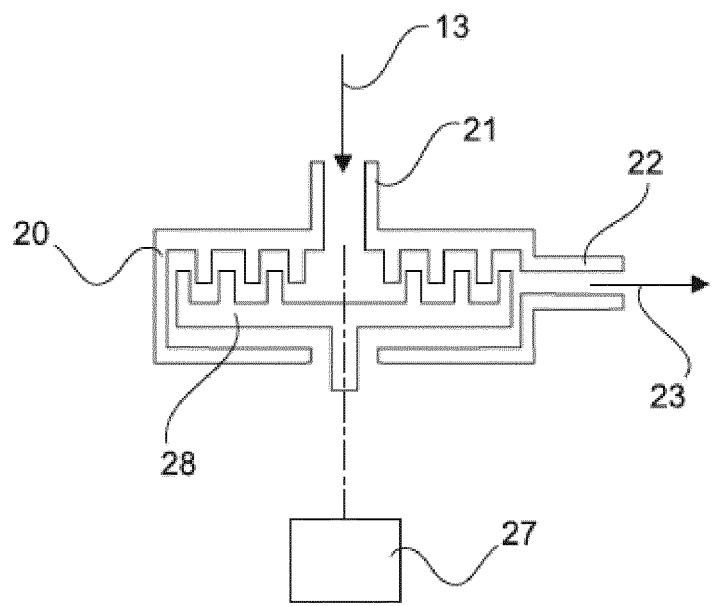
FIG. 4 shows an exemplary structure of a homogenization volume according to an exemplary embodiment of the invention.

FIG. 4 shows an exemplary embodiment of a homogenization volume. The homogenization volume 20 can in this case have, for example, a relatively small volume, in particular when no further dilution is to take place in the homogenization volume 20. In this case, the mash 13 can be fed to the homogenization volume via an inlet 21 and be homogenized by a mixer 28. The mixer 28 can be driven and controlled, for example by a drive 27. The mixer 28 in the homogenization volume 20 can be, for example, a rotor-stator mixer, for example a toothed-rim dispersion machine.

The homogenization volume 20 can be, for example, also the housing of a mixer, in particular of a rotor-stator mixer, e.g. a toothed-rim dispersion machine.

Figure 5:
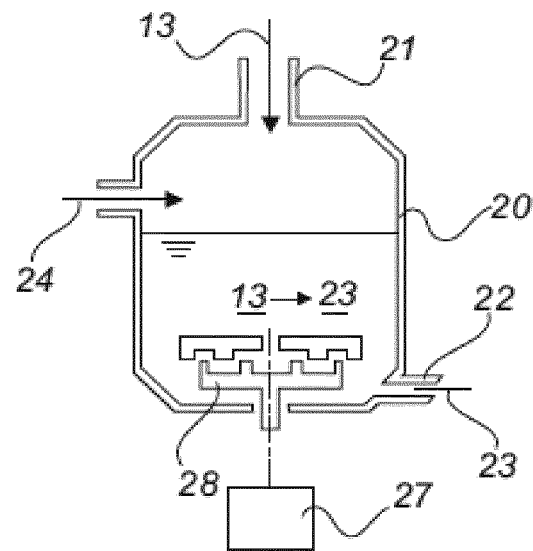
FIG. 5 shows an exemplary embodiment of a homogenization volume according to an exemplary embodiment of the invention.

FIG. 5 shows an exemplary embodiment of a homogenization volume 20, in which, for example, a dilution can also proceed via a second dilution liquid 24. Via an inlet 21, for example, the mash 13 arrives in the homogenization volume 20. The mash 13 can be processed to a homogenized mash by a corresponding mixer 28 in the homogenization volume 20, which homogenized mash has, for example, a lower concentration than the mash 13. The mixer 28 provided in the homogenization volume 20 can be driven and controlled, for example by a drive 27. The homogenized mash 23 can be taken off via an outlet 22. The homogenized mash 23 in FIG. 5 is in this case a diluted homogenized mash.

Figure 6:
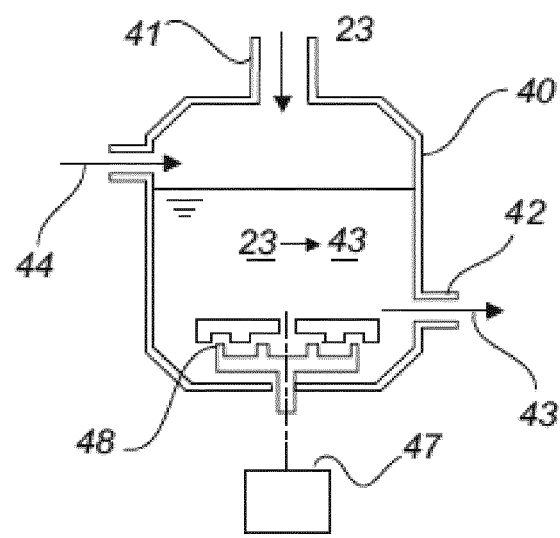
FIG. 6 shows an exemplary makeup of a dilution volume according to an exemplary embodiment of the invention.

FIG. 6 shows an exemplary embodiment of a dilution volume 40. The homogenized mash 23 can be fed, for example via an inlet 21, to the dilution volume 40. Via a further inlet, a third dilution liquid 44 can be added, in such a manner that a diluted homogenized mash 43 is generated from the homogenized mash 23. This dilution can be promoted, for example, by a mixer 48 which can be controlled and driven by a drive 47. The mixer 48 can be, for example, a high-shear mixer. The diluted homogeneous mash 43 can then be taken off via an outlet 42.

It should be noted that the expression "comprising" does not exclude further elements or method steps, likewise the expression "a" and "an" does not exclude a plurality of elements and steps.

The reference signs used serve merely to increase the comprehensibility and should in no case be considered to be restricting, wherein the scope of protection of the invention is given in the claims.

LIST OF REFERENCE SIGNS

1 Device for preparing a concentrated polysaccharide mass
9 Polysaccharide mass
10 Blending volume
11 Inlet in the blending tank for concentrated polysaccharide mass
12 Outlet in the blending tank for mash
13 Mash
14 First dilution liquid
17 Drive for mixer in the blending tank
18 Mixer in the blending tank
20 Homogenization volume
21 Inlet in the homogenization volume for mash
22 Outlet in the homogenization volume for homogenized mash
23 Homogenized mash
24 Second dilution liquid
27 Drive for mixer in the homogenization volume
28 Mixer in the homogenization volume
40 Dilution volume
41 Inlet in the dilution volume for homogenized mash
42 Outlet in the dilution volume for diluted homogenized mash
43 Diluted homogeneous mash
44 Third dilution liquid
47 Drive for mixer in the dilution volume
48 Mixer in the dilution volume
S10 Method step of blending the concentrated polysaccharide mass S20 Method step of homogenizing the mash
S40 Method step of diluting the homogenized mash

EXAMPLES

1. Production of Schizophyllan

For the experiments, *Schizophyllum commune* was used, and schizophyllan was used for fermentation in the fed-batch culture method, as described in "Udo Rau, Biopolymers, edited by A. Steinbüchel, published by WILEY-VCH, volume 6, pages 63 to 79".

2. Determination of the Schizophyllan Content

1. Weigh out a small amount of the presscake containing schizophyllan, water and a solvent
2. Dilute with demineralized water
3. Shake vigorously by hand in order to obtain a schizophyllan sample
4. Briefly disperse schizophyllan sample using the Ultra-turrax
5. Produce an analysis sample comprising water, glucanase mixture and schizophyllan sample
6. Produce a blank sample comprising a schizophyllan sample
7. Incubate the analysis sample at 40° C. for 2 to 24 h
8. Filter analysis and blank samples through a syringe filter and analyze the glucose content by means of HPLC
9. Calculate the schizophyllan concentration from the difference between residual glucose and glucose after enzyme treatment minus the water of hydrolysis 3. Determination of the FR (Filtration Ratio) Value Measurement Principle:

In the determination of the FR (filtration ratio) value, the amount of filtrate which passes through a defined filter is determined as a function of time. The FR value is determined according to the following formula (I)

$$FR = (t_{190g} - t_{170g})/(t_{70g} - t_{50g}) \quad (I),$$

where the variables and the equation have the following meaning:
$t_{190g}$ = time in which 190 g of filtrate are obtained,
$t_{170g}$ = time in which 170 g of filtrate are obtained,
$t_{70g}$ = time in which 70 g of filtrate are obtained,
$t_{50g}$ = time in which 50 g of filtrate are obtained.

Therefore, in each case, the time period is determined which is needed in each case for 20 g of filtrate to flow through the filter, i.e. at an early and late time point in the filtration process, and the quotient of the two time periods is calculated. The greater the FR value, the greater the decrease of filtration rate with increasing time of the filtration process. This indicates an increasing blocking of the filter, for example by gels or particles.

The FR value is determined using the following method:
3.1. Apparatus
a) Sartorius pressure filtration apparatus 16249; filter diameter 47 mm; with 200 ml of infusion space (Øi=41 mm)
b) Isopore membrane 1.2 μm; Ø 47 mm; No. RTTP04700, obtainable from Merck Millipore
c) Balance
3.2. Preparation of the Glucan Solution
First, 50 g of a mixture of the glucan solution obtained from the experiments and water are produced, more precisely in a ratio such that the glucan concentration is 1.75 g/l. The mixture is stirred for 10 min and examined visually for homogeneity. If the mixture is still not homogeneous, it is stirred further until the mixture is homogeneous. Thereafter, the mixture is brought to a total amount of 250 g using 200 g of ultrapure water. Then, the mixture is stirred for at least 1 h for the homogenization, after which the pH is adjusted to 6.0 using 0.1 M NaOH and then stirred for a further 15 min. The pH of 6.0 is examined again. The final concentration of the glucan in the mixture is 0.35 g/l.
3.3. Carrying Out the Filtration Test The filtration test proceeds at room temperature (T=25° C.) at a pressure of 1.0 bar (compressed air or $N_2$).
Place coarse perforated plate onto the screen plate
Place fine perforated plate onto the screen plate
Place membrane filter thereon
Insert O-ring
Screw sieve plate and outlet tap onto the cylinder
Close outlet tap
Introduce 220 g (about 220 ml) of solution
Screw upper covering onto cylinder
Clamp air inlet hose
Examine pressure and adjust to 1.0 bar
Place beaker on the balance below the filtration apparatus. Press taring button.
Open outflow tap
Stop the test when filtrate no longer exits.
With the balance, the amount of filtrate is determined as a function of time. The mass indicated each time can be read off by eye, but of course also automatically, and analyzed.

4. Redispersion—Example 1

4.1. Blending

A concentrated schizophyllan mass (2100 g) having a concentration of 92 g/l was introduced into a Cavimix® 1032 high-shear mixer from Cavitron, from Hagen & Funke, Sprockhövel, Germany. The starting concentration of the schizophyllan mass was 92 g of schizophyllan per liter of schizophyllan mass, wherein the concentration is determined according to the above-described method. The schizophyllan mass was in the form of chunks having a volume of 25 cm×25 cm×2 cm. 14 350 g of water were added and the high-shear mixer was used for 10 minutes at a speed of rotation of 508 revolutions per minute. A mash was obtained that had a concentration of 11.8 g of schizophyllan per liter, and comprised particles having a mean diameter of ≤10 mm.
4.2. Homogenization The mash was introduced into a Megatron® MT3-61 GMF rotor-stator mixer from Kinematica, Littau, Switzerland. The mixer was operated without addition of further water at a speed of rotation of 6400 revolutions per minute and a flow rate of 150 kg of mash per hour. A homogenized mash was obtained that had a concentration of 11.8 g of schizophyllan per liter, and in which particles could no longer be observed visually.
4.3. Dilution The homogenized mash was introduced into a Cavitron® CD 1000 high-shear mixer, from Cavitron from Hagen & Funke, Sprockhövel, Germany. The parameters for operating the mixer, the concentrations of the schizophyllan in the diluted homogenized mash and the FR values of the diluted homogenized mash are shown in table 1.

TABLE 1

| Sample | Peripheral velocity (m/s) | Flow rate (kg/h) | Schizophyllan concentration (g/l) | FR value | [c1]:[c4] ratio |
|---|---|---|---|---|---|
| 1 | 18.5 | 10 | 0.36 | 2.18 | 256 |
| 2 | 37 | 10 | 0.36 | 2.34 | 256 |
| 3 | 18.5 | 4.6 | 0.19 | 1.60 | 484 |
| 4 | 18.5 | 4.2 | 0.22 | 1.53 | 418 |

5. Redispersion—Example 2 and Comparative Example

5.1. Blending and Dilution with Homogenization of the Mash (Example According to the Invention)

5.1.1 Blending

A concentrated schizophyllan mass (2375 grams) having a concentration of 63 grams Schizophyllan per liter Schizophyllan mass (concentration [c1]) was introduced into a Cavimix® 1032 high-shear mixer from the company Cavitron from Hagen & Funke, Sprockhövel, Germany. The starting concentration of the schizophyllan mass was determined according to the above-described method. The schizophyllan mass was in the form of chunks having a volume of 25 cm×25 cm×2 cm. 12 600 grams of an aqueous saline solution were added. Besides water the aqueous saline solution contained 26.94 g/l sodium chloride, 0.56 g/l calcium chloride dihydrate, 1.1 g/l magnesium chloride hexahydrate and 0.69 g/l potassium chloride. The high-shear mixer was used for 10 minutes at a speed of rotation of 290 revolutions per minute. A mash was obtained that had a concentration of 10 grams of schizophyllan per liter (concentration [c2]) and comprised particles having a mean diameter of ≤10 mm.

5.1.2. Homogenization

The mash was introduced into a Megatron® MT3-61 GMF rotor-stator mixer from the company Kinematica, Littau, Switzerland. The mixer was operated without addition of further water at a speed of rotation of 6400 revolutions per minute and a flow rate of 60 kg of mash per hour in a single passage. A homogenized mash was obtained that had a concentration of 10 grams of schizophyllan per liter (concentration [c3]) and in which particles could no longer be observed visually.

5.1.3. Dilution

The homogenized mash was introduced into a Cavitron® CD 1000 high-shear mixer from the company Cavitron from Hagen & Funke, Sprockhövel, Germany. The flow rate of the homogenized mash was 10.2 kg/h. It was diluted with a dilution flow of the aqueous saline solution with a flow rate of 280 kg/h. The dilution was performed directly after mashing and homogenization without any further waiting time. The parameters for operating the mixer, the concentrations of the schizophyllan in the diluted homogenized mash and the FR values of the diluted homogenized mash are shown in table 2.

TABLE 2

| Dilution of the sample | Peripheral velocity CD 1000 (m/s) | Flow rate of mash (kg/h) | Schizophyllan concentration ([c4] in g/l) | FR value | [c1]:[c4] ratio |
|---|---|---|---|---|---|
| 0 h after mashing | 18 | 10.2 | 0.36 | 1.63 | 175 |

5.2. Blending and Dilution without Homogenization of the Mash (Comparative Example)

5.2.1. Blending

A concentrated schizophyllan mass (2375 grams) of the same feed material as in the example according to the invention (see section 5.1 above) having a concentration of 63 grams Schizophyllan per liter Schizophyllan mass (concentration [c1]) was introduced into a Cavimix® 1032 high-shear mixer from the company Cavitron from Hagen & Funke, Sprockhövel, Germany. The schizophyllan mass was in the form of chunks having a volume of 25 cm×25 cm×2 cm. 12 600 grams of an aqueous saline solution were added. Besides water the aqueous saline solution contained 26.94 g/l sodium chloride, 0.56 g/l calcium chloride dihydrate, 1.1 g/l magnesium chloride hexahydrate and 0.69 g/l potassium chloride. The high-shear mixer was used for 10 minutes at a speed of rotation of 290 revolutions per minute. A mash was obtained that had a concentration of 10 grams of schizophyllan per liter (concentration [c2]) and comprised particles having a mean diameter of ≤10 mm.

5.2.2. Dilution

The mash was introduced into a Cavitron® CD 1000 high-shear mixer from the company Cavitron from Hagen & Funke, Sprockhövel, Germany. The flow rate of the homogenized mash was 10.2 kg/h. It was diluted with a dilution flow of the aqueous saline solution with a flow rate of 280 kg/h. The dilution was performed in separate experiments directly after mashing as well as 2 hours, 4 hours, 6 hours and 24 hours after mashing. During the waiting time the mash was stirred in the mashing volume.

The parameters for operating the mixer, the concentrations of the schizophyllan in the diluted mash and the FR values of the diluted mash are shown in table 3 for the dilutions performed at different times (from 0 hours to 24 hours after the mashing).

TABLE 3

| Dilution of the sample | Peripheral velocity CD 1000 (m/s) | Flow rate of mash (kg/h) | Schizophyllan concentration ([c4] in g/l) | FR value | [c1]:[c4] ratio |
|---|---|---|---|---|---|
| 0 h after mashing | 18 | 10.2 | 0.36 | 2.20 | 175 |
| 2 h after mashing | 18 | 10.2 | 0.38 | 2.83 | 166 |
| 4 h after mashing | 18 | 10.2 | 0.36 | 1.90 | 175 |
| 6 h after mashing | 18 | 10.2 | 0.38 | 2.40 | 166 |
| 24 h after mashing | 18 | 10.2 | 0.38 | 2.04 | 166 |

As can be seen from a comparison of the results in table 2 and table 3 (0 h after mashing), the method according to the invention, which comprises a homogenization after blending and before dilution, yields significantly better FR values than the method according to the state of the art.

The invention claimed is:

1. A method for preparing a concentrated polysaccharide mass, wherein the method comprises:
   (1) blending the concentrated polysaccharide mass having a polysaccharide concentration [c1] in the range from ≥50 g to ≤800 g of polysaccharide per liter of concentrated polysaccharide mass, to obtain a mash having a polysaccharide concentration [c2] in the range from ≥5 g to ≤50 g of polysaccharide per liter of mash, wherein the blending comprises adding a first dilution liquid, and during the blending a particle size of particles of the concentrated polysaccharide mass is decreased and mixing with the first dilution liquid proceeds;

(2) homogenizing the mash having a polysaccharide concentration [c2], in order to obtain a homogenized mash having a polysaccharide concentration [c3] in the range from ≥5 g to ≤50 g of polysaccharide per liter of homogenized mash, wherein, during the homogenization, homogenization of particles in the mash proceeds;

(3) diluting the homogenized mash having a polysaccharide concentration [c3], in order to obtain a diluted homogenized mash having a polysaccharide concentration [c4] in the range from ≥0.05 g to ≤2.0 g of polysaccharide per liter of diluted homogenized mash, wherein the dilution comprises addition of a third dilution liquid, wherein the ratio of [c1] to [c4] is in the range from ≥1:30 to ≤1:20 000.

2. The method according to claim 1, wherein the ratio of [c1] to [c4] is in the range from ≥1:30 to ≤1:10 000.

3. The method according to claim 1, wherein the polysaccharide comprises at least one alpha-glucan, a beta-glucan or a xanthan.

4. The method according to claim 1, wherein the homogenization in step (2) comprises an addition of a second dilution liquid.

5. The method according to claim 1, wherein the homogenization in step (2) comprises at least one first stage and one second stage of a homogenization, of which the second stage has a higher homogenization than the first stage.

6. The method according to claim 1, wherein the dilution of the homogenized mash in step (3) comprises a further homogenization of the homogenized mash.

7. The method according to claim 1, wherein the homogenization in step (2) and the dilution in step (3) each proceed in a continuous-flow process in which a substantially continuous flow proceeds from a blending volume into a homogenization volume and from the homogenization volume into a dilution volume.

8. A method for recovering fossil fuels from rock, wherein the method comprises:
method according to claim 1 and,
(4) introducing the diluted homogenized mash into a rock for recovering fossil fuels from the rock.

* * * * *